J. SLEPIAN.
PERMEAMETER.
APPLICATION FILED JULY 25, 1918.
1,360,326.
Patented Nov. 30, 1920.
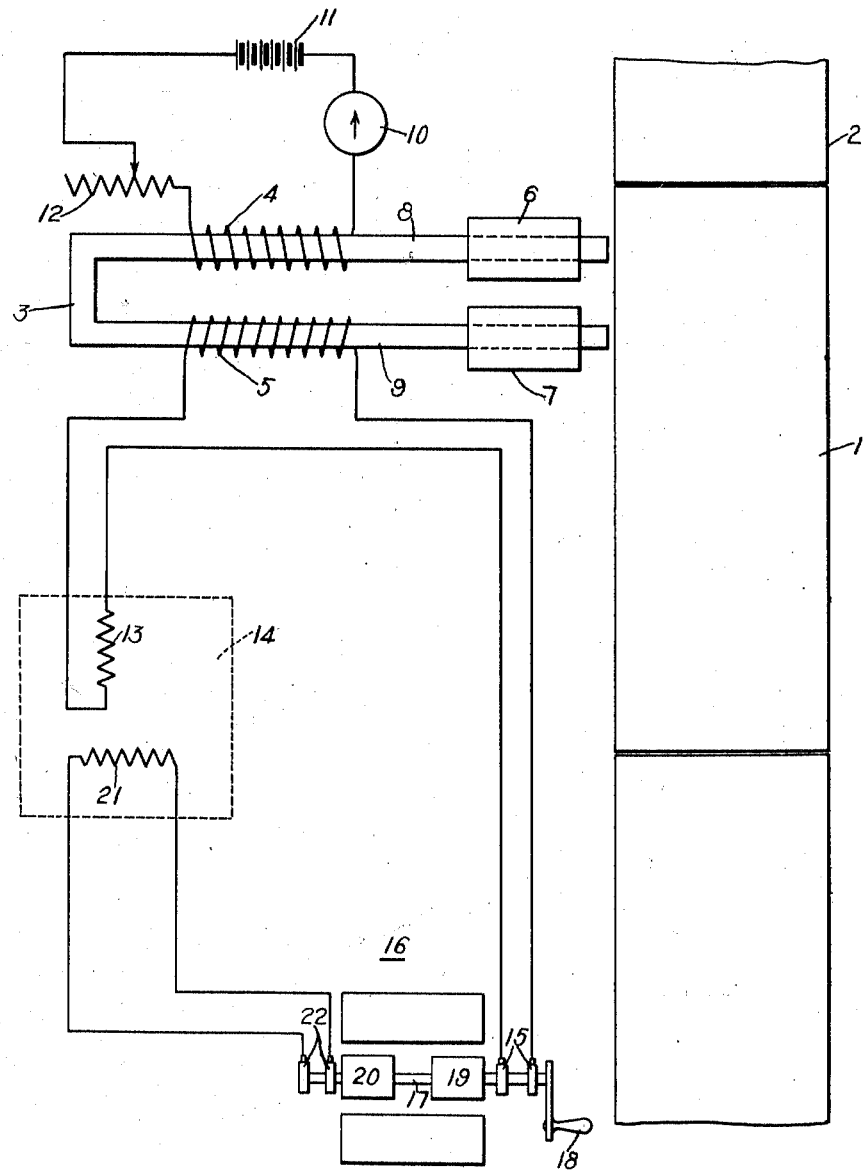
WITNESSES:
H. B. Funk.
Fred. H. Miller
INVENTOR
Joseph Slepian
BY
Wesley G. Carr
ATTORNEY

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

PERMEAMETER.

1,360,326.   Specification of Letters Patent.   Patented Nov. 30, 1920.

Application filed July 25, 1918. Serial No. 246,770.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Permeameters, of which the following is a specification.

My invention relates to electrical-measuring instruments and particularly to permeameters.

The object of my invention is to provide a device of the above indicated character that shall be simple and effective in operation and that shall eliminate the losses caused by air-gap resistance between the same and a sample to be tested.

In a usual permeameter, the magneto-motive force consumed at the contact points in the magnetic circuit between the instrument and the sample to be tested is a source of error in the reading of the instrument. The extent of the loss resulting from this source of error is uncertain, frequently being relatively great, and the readings obtained are often accepted only from a knowledge of what they should be and from the fact that great care has been taken in adjusting the sample with respect to the instrument.

In practising my invention, I provide a device having means for nullifying the magnetic drop across an air-gap in a manner similar to that of eliminating voltage drop across the contacts of a potentiometer and by which arcuate readings may be obtained quickly and by a simple operation.

The single figure of the accompanying drawings is a diagrammatic view of a permeameter embodying my invention.

A sample member 1 of iron or steel, the permeability of which is to be determined, is placed against, and in series relation with, a standard iron or steel member 2 of known permeability. The same direct flux, caused by any suitable source (not shown), is sent through the members 1 and 2. A magnetizable yoke member 3, preferably of iron, is provided with coils 4 and 5 and flux-damping rings 6 and 7 on the legs 8 and 9 thereof. The coil 4 is connected in series relation with an ammeter 10, a battery 11 and an adjustable rheostat 12. The coil 5 is connected in series relation with a coil 13 of a dynamometer 14 and is energized, through a collecting device 15, from an alternating-current generator 16. A shaft 17 of the generator 16, that may be rotated by hand, by means of a handle 18 at one end thereof or be operated in any other suitable manner, supports two armatures 19 and 20, the former for supplying a current of one frequency to the coils 5 and 13 and the latter for supplying a current of double this frequency to another coil 21 of the dynamometer 14 through a collecting device 22. Either of the coils 13 and 21 may be stationary and the other movable and the movable coil may have indicating means (not shown) attached thereto. With single and double frequencies in the currents traversing the coils 13 and 21, respectively and no other influence affecting the currents therein, there will be no deflection of the movable coil, by reason of the fact that the components of the respective current-waves thereof, will balance each other.

With the yoke 3 placed against the sample 1, as shown, a portion of the flux in the members 1 and 2 will flow through the legs 8 and 9. This flux will cause a second harmonic, through the coil 5, in the current wave of the coil 13, and thus cause a deflection of the movable coil of the dynamometer. By adjusting the rheostat 12, a direct flux may be set up in the yoke 3 to balance the flux therein from the sample 1, the magnetic drop across the ends of the legs 8 and 9 being thus neutralized by reason of the fact that the magneto-motive force of the coil 4 will just balance the same. This, in effect, is similar to the manner of eliminating contact-drop in a potentiometer. When a balance has been effected and the movable coil of the dynamometer is no longer deflected, a current reading may be observed on the ammeter 10. With the yoke 3 placed against the member 2 of known permeability and the above process repeated, the first current reading will be to the second current reading as the permeability of the sample is to the permeability of the standard member.

While I have shown and described a particular form of my invention, changes may be effected therein without departing from the spirit and scope thereof, as set forth in the appended claims.

I claim as my invention:

1. A permeameter comprising means for receiving flux from a sample member, and indicating means for neutralizing said flux and determining the permeability of the sample.

2. A permeameter comprising a magnetizable member to receive flux from a sample member, means for neutralizing said flux and determining the permeability of the sample, and means for indicating the neutralization of the flux.

3. A permeameter comprising a magnetizable member to receive flux from a sample member, means for neutralizing said flux, means for indicating the neutralization of the flux, and means for indicating the effort expended in neutralizing the flux.

4. A permeameter comprising a magnetizable member to receive flux from a sample member, and means coöperating with said magnetizable member at one side of the air gap between said members for eliminating the effect of the air gap and determining the permeability of the sample.

5. A permeameter comprising a magnetizable member, a coil thereon for receiving an adjustable direct current, a second coil on said member for receiving an alternating current of single frequency, an indicating device, said second coil being connected to said indicating device, and means for supplying an alternating current of double frequency to said indicating device.

6. A permeameter comprising a magnetizable member, a coil thereon for receiving a direct current, a second coil on said member, means for supplying an alternating current of single frequency to said second coil, an indicating device, said second coil being connected to said indicating device, a coöperating coil in said indicating device and means associated with the means for supplying said single frequency for supplying an alternating-current of double frequency to said coöperating coil.

7. A permeameter comprising a magnetizable yoke, a coil on one leg thereof for receiving an adjustable direct current, means for indicating the value of said current, a second coil on the other leg of said yoke for receiving an alternating current, an indicating device having coöperating stationary and movable coils, said second coil being connected in circuit with one of the coils of said indicating device and means for supplying an alternating-current of double the frequency of the current in said second coil to the other coil of said indicating device.

8. A permeameter comprising a magnetizable yoke, damping rings disposed on the legs of said yoke, a coil on one of said legs for receiving an adjustable direct current, means in circuit with said coil for indicating the value of said direct current, a second coil on the other leg of said yoke, means for supplying an alternating-current of a predetermined frequency to said coil, a dynamometer, said second coil being connected in circuit with one coil of said dynamometer and means for supplying an alternating-curent of double the frequency supplied to said second coil to the other coil of said dynamometer.

9. A permeameter comprising a magnetizable member, a coil thereon for receiving an adjustable direct current, a second coil on said member, an indicating device connected to said second coil and means for supplying alternating-current to said second coil and to said indicating device.

10. A permeameter comprising a magnetizable member to receive flux from a sample member, means for neutralizing said flux, means for indicating said neutralization and means depending on the amount of effort required to effect said neutralization for indicating the permeability of said sample member.

In testimony whereof, I have hereunto subscribed my name this 17th day of July, 1918.

JOSEPH SLEPIAN.

It is hereby certified that in Letters Patent No. 1,360,326, granted November 30, 1920, upon the application of Joseph Slepian, of Wilkinsburg, Pennsylvania, for an improvement in "Permeameters," an error appears in the printed specification requiring correction as follows: Page 1, line 36, for the word "arcuate" read *accurate;* and that the said Letters Patent should be read with this correction therein that the same may conform to the record of the case in the Patent Office.

Signed and sealed this 25th day of January, A. D., 1921.

[SEAL.]

L. B. MANN,
*Acting Commissioner of Patents.*

Cl. 175—183.